(12) United States Patent
Naruse et al.

(10) Patent No.: US 7,127,237 B2
(45) Date of Patent: Oct. 24, 2006

(54) COMMUNICATION TERMINAL HAVING CALLER IDENTIFICATION INFORMATION DISPLAY FUNCTION

(75) Inventors: Akiko Naruse, Hino (JP); Akira Ishikura, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 437 days.

(21) Appl. No.: 09/893,905

(22) Filed: Jun. 29, 2001

(65) Prior Publication Data

US 2002/0002044 A1 Jan. 3, 2002

(30) Foreign Application Priority Data

Jun. 29, 2000 (JP) ............................. 2000-196321
Jun. 29, 2001 (JP) ............................. 2001-200134

(51) Int. Cl.
H04M 1/56 (2006.01)
H04M 15/06 (2006.01)
H04M 1/00 (2006.01)
H04M 3/42 (2006.01)
H04B 1/38 (2006.01)

(52) U.S. Cl. ................. 455/415; 455/566; 379/142.04; 379/142.08

(58) Field of Classification Search ................ 455/415; 379/142.04, 207.15; H04M 1/57
See application file for complete search history.

(56) References Cited

U.S. PATENT DOCUMENTS 5,546,447 A * 8/1996 Skarbo et al. ......... 379/142.05
5,724,412 A * 3/1998 Srinivasan ............... 379/93.23
6,226,367 B1 * 5/2001 Smith et al. ........... 379/142.04
6,442,263 B1 * 8/2002 Beaton et al. ......... 379/142.04
6,466,653 B1 * 10/2002 Hamrick et al. .......... 379/67.1
6,721,406 B1 * 4/2004 Contractor ............ 379/142.06
2002/0159574 A1* 10/2002 Stogel ..................... 379/93.01
2003/0147518 A1* 8/2003 Albal et al. ............ 379/207.15
2004/0208301 A1* 10/2004 Urban et al. ........... 379/142.17
2004/0240651 A1* 12/2004 Adams et al. ......... 379/142.08

FOREIGN PATENT DOCUMENTS

EP         498997 B1 *  6/1997
JP      2000134316 A  *  5/2000
JP      2000-134316      12/2000

* cited by examiner

Primary Examiner—Fan Tsang
Assistant Examiner—Lisa Hashem
(74) Attorney, Agent, or Firm—Finnegan, Henderson, Farabow, Garrett & Dunner, L.L.P.

(57) ABSTRACT

A communication terminal according to the present invention is configured so that a user can selectively set any one of a first display mode for displaying a CLI message with high priority, a second display mode for displaying a phone book storage information with high priority, and a third display mode for displaying both of the CLI message and phone book storage information. When an incoming call takes place, it is determined whether or not any one of the first, second, and third modes is set. According to the determination result, the caller name notified by the CLI message and the user name stored in the phone book are selectively displayed.

4 Claims, 4 Drawing Sheets

PHONE BOOK 400

| TELEPHONE NUMBER | NAME |
|---|---|
| 090-△△△△-1234 | JACK |
| 090-××××-5678 | ICHIRO |
| 090-○○○○-9876 | KAZ |
| ⋮ | ⋮ |

CLI MESSAGE

| 090-○○○○-9876 |
|---|
| SUZUKI KAZUHIRO |

FIG. 6

SUZUKI KAZUHIRO

FIG. 7

KAZ

FIG. 8

090-☐☐☐☐-5432
TOKYO MAMI

FIG. 9

SUZUKI KAZUHIRO
KAZ

COMMUNICATION TERMINAL HAVING CALLER IDENTIFICATION INFORMATION DISPLAY FUNCTION

CROSS-REFERENCE TO RELATED APPLICATIONS

This application is based upon and claims the benefit of priority from the prior Japanese Patent Application No. 2000-196321, filed Jun. 29, 2000, the entire contents of which are incorporated herein by reference.

BACKGROUND OF THE INVENTION

1. Field of the Invention

The present invention relates to a communication terminal with a function for notification of a message that contains at least one of a caller phone number and a caller name to a called terminal.

2. Description of the Related Art

The CDMA standard, IS-95A specifies a CLI (Call Line Identifier) message notification function. The CLI message notification function generates a CLI message that contains a caller phone number of a first terminal that is an outgoing call source, over a network, when the first terminal transmits an outgoing call signal to a destination, the second terminal. Then, when an incoming call signal is transmitted to a second terminal that is an incoming call destination over the network, the network notifies of the CLI message to the second terminal (the called terminal).

Upon receipt of the CLI message, the second terminal compares the caller phone number contained in the received CLI message with a user identification information stored in the phone book. Then, if the user identification information corresponds to the caller phone number, the second terminal displays the stored user identification information corresponding to the caller phone number, for example, a user name on a display. With this configuration makes it possible for a user of the second terminal to check a caller prior to an incoming call response operation, which is very convenient.

However, the CLI message contains only the caller phone number. Because of this, in the case where the second terminal does not comprise a phone book or in the case where the corresponding storage information is not stored even if the terminal comprises the phone book, it is impossible for the second terminal user to know detailed information related to the caller, such as a caller name.

In view of this circumstance, a CDMA standard, IS-95B that is an upgraded version of the above IS-95A has specified that the CLI message contains a caller name as well as the caller phone number. If the second terminal receives the CLI message containing the caller name, even if the second terminal does not comprise the phone book or if the storage user identification information corresponding to the received caller phone number is not stored in the phone book, it becomes possible for the user to specify the caller with verifying the received caller name.

However, in the case where the second terminal comprises the phone book, and moreover, the user identification information corresponding to the caller is stored in this phone book, the phone book storage user identification information and the caller name notified by the CLI message may be displayed so that they coexist. If such display is made, the user will be confused, which is not preferable.

BRIEF SUMMARY OF THE INVENTION

The present invention has been made in order to solve the foregoing problem. It is an object of the present invention to provide a communication terminal capable of effectively displaying identification information on a communication party stored in a phone book and identification information on a caller notified by a CLI message without causing a user to be confused.

In order to achieve the foregoing object, according to a first aspect of the present invention, there is provided a communication terminal comprising display mode setting means for a user to selectively set a first display mode for displaying only a received message notified over a network and a second display mode for displaying only a stored user identification information. It is determined whether the first display mode or the second display mode is set. According to this determination result, a caller name contained in the received message and a user name stored in the phone book are selectively displayed.

Specifically, the following display control is performed. First, in the case where it is determined that the first display mode is set, the message received by the message receiving means is displayed.

In addition, when it is determined that the second display mode is set, a caller phone number contained in the received message is collated with a user phone number stored in the phone book. Then, when it is determined that the user phone number corresponding to the caller phone number contained in the received message is not stored in the phone book, the received message is displayed. If the received message contains the caller name, it is preferable that this caller name be displayed.

In contrast, when it is determined that the user phone number corresponding to the caller phone number contained in the received message is stored in the phone book, the storage information on the phone book is displayed.

Further, when an incoming call takes place, it is determined whether the first display mode is set, the second display mode is set, or a third display mode for displaying both of the received message and the storage user identification information in the phone book is set. The display control means displays both of the message received by the message receiving means and the storage user identification information in the phone book when it is determined that the third display mode is set by the message receiving means.

Therefore, according to the first aspect of the present invention, the terminal user can selectively set in advance whether the received message to be notified over the network is displayed with the high priority, the phone book storage user identification information that the terminal comprises is displayed with the high priority, or both of the received message and the storage user identification information in the phone book are displayed. Because of this, when the incoming call arrives, the terminal user displays the caller identification information (caller ID) in accordance with one's desired display mode, thereby making it possible to check the caller.

On the other hand, according to a second aspect of the present invention, there is provided a communication terminal connected to a network, the communication terminal comprising a service function for notifying a message that contains of the caller phone number and caller name, wherein, the caller phone number contained in the message received over a network is collated with the user phone number stored in the phone book. Then, when the user phone number corresponding to the caller phone number contained in the received message is not stored in the phone book, the above received message is selectively displayed. If the received message contains a caller name, it is preferable that this caller name be displayed.

In addition, when it is determined that the user phone number of the communication party user corresponding to the caller phone number contained in the received message is stored in the phone book, the user name of a communication partner stored in the phone book is selectively displayed.

Therefore, according to the second aspect of the present invention, when the caller phone number notified by the message over the network is not registered, caller identification information notified by the message, for example, at least one of the caller phone number and caller name is displayed. Because of this, it becomes possible for the called user to know a caller based on this display result. In contrast, the caller phone number notified by the received message is registered in a phone book, the storage user identification information in this phone book is displayed. Because of this, it becomes possible for the called user to clearly and quickly recognize a caller by one's registered phone book identification information, for example, by nickname.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 6 is a view showing a display example when a CLI message priority display mode is set;

FIG. 7 is a view showing a display example when a phone book priority display mode is set, and the caller phone number in the CLI message is stored in the phone book;

FIG. 8 is a view showing a display example when the phone book priority display mode is set, and the caller phone number in the CLI message is not stored in the phone book; and FIG. 9 is a view showing a display example when a mode for displaying both of the CLI message and phone book storage information is set.

DETAILED DESCRIPTION OF THE INVENTION

Figures 1, 3, 4:
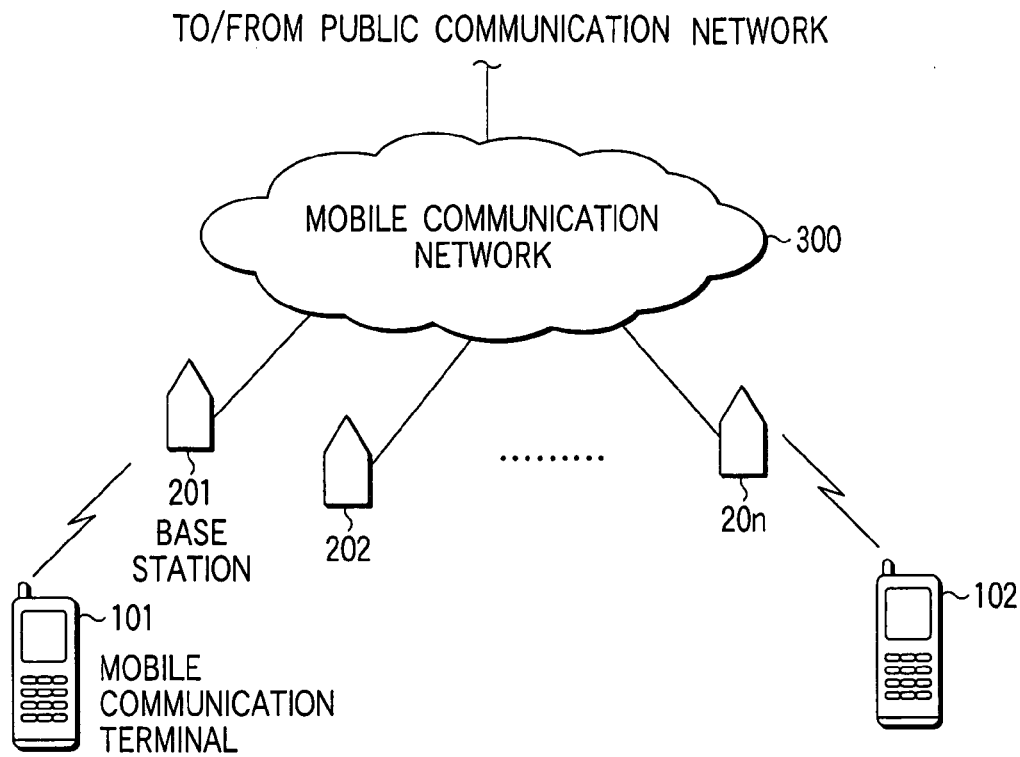
FIG. 1 is a schematic view showing a configuration of a mobile communication system according to one embodiment of the present invention.
FIG. 3 is a view showing an exemplary phone book provided at the mobile communication terminal shown in FIG. 2.
FIG. 4 is a view showing an example of caller identification information transmitted by a CLI message.

FIG. 1 is a schematic view showing a configuration of a mobile communication system according to one embodiment of the present invention. This system includes a mobile communication network 300, a plurality of base stations 201–20n, and a plurality of mobile communication terminals 101 and 102. The above base stations 201–20n are disposed to be dispersed in a service area, each of which forms a radio area called a cell. The mobile communication network 300 comprises an exchange facility. The exchange facility is connected to the base stations 201–20n via a wire line, and is connected to a public communication network (not shown). The public communication network contains a computer network such as Internet or public telephone network such as PSTN or ISDN.

In the radio area, each mobile communication terminal is connected to one of the base stations via a radio channel, and further, is connected to the mobile communication network 300 through the base station. The mobile communication network 300 is connected to be exchanged between the mobile communication terminals 101 and 102 or between each of these mobile communication terminals 101 and 102 and another communication terminal (not shown) to be connected to the public communication network.

Figure 2:
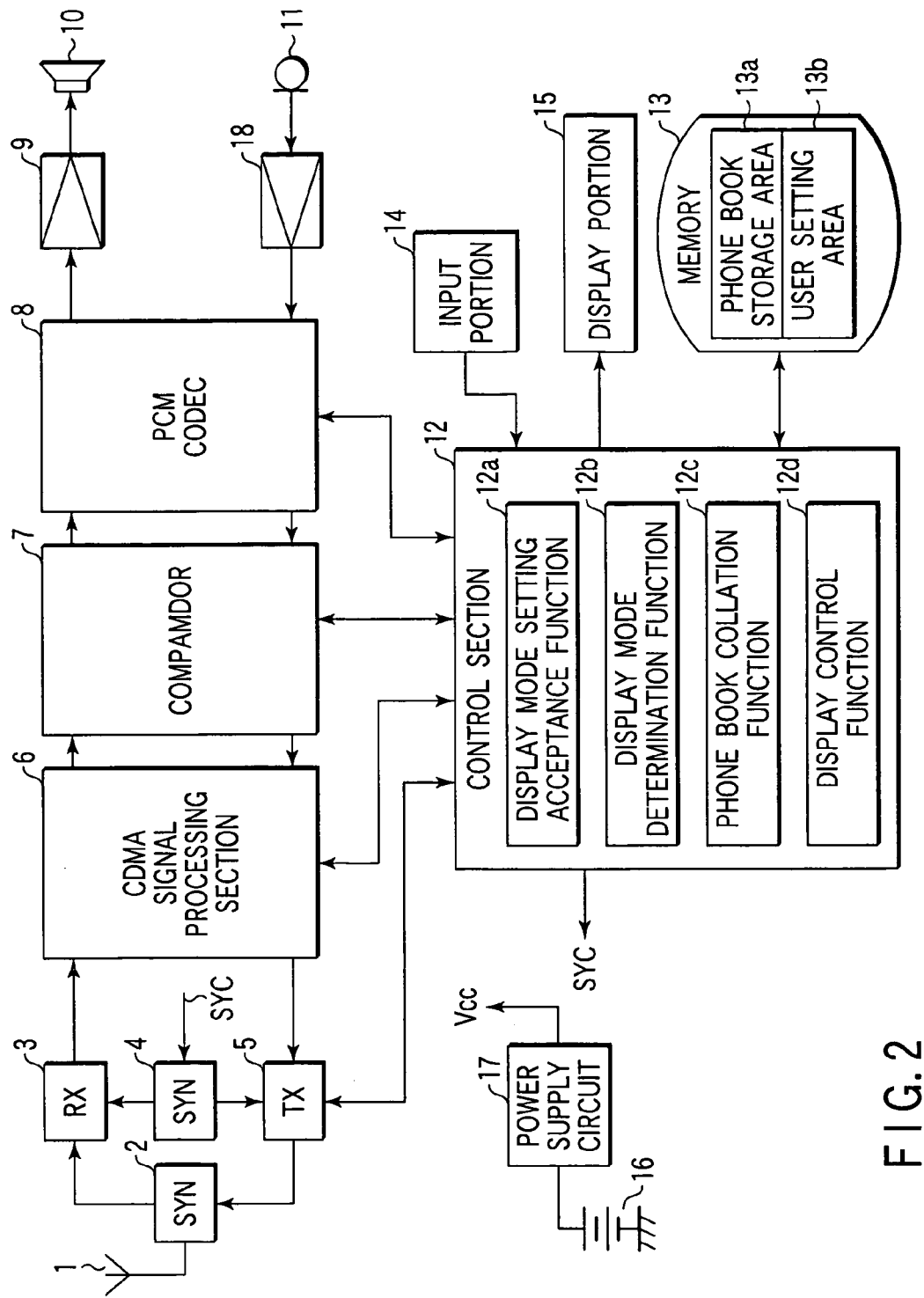
FIG. 2 is a block diagram depicting an exemplary configuration of a mobile communication terminal for use in the system shown in FIG. 1.

In addition, the mobile communication network 300 comprises a service function for notifying a CLI message. This service function generates a CLI message in the mobile communication network 300 in the case where the mobile communication terminal 101 transmits an outgoing signal to the mobile communication terminal 102 that is an incoming call destination, for example, and notifies the CLI message to the mobile communication terminal 102 together with an incoming call signal. The CLI message is generated based on a subscriber database that a communication provider (carrier) has. A phone number of the mobile communication terminal 101 that is an outgoing call source and the caller name of the terminal 101 are inserted into the CLI message. FIG. 4 shows an example of such a message In the meantime, the mobile communication terminals 101 and 102 are configured as follows. FIG. 2 is a block diagram depicting a functional configuration of these terminals.

That is, radio signals transmitted from the base stations 202–20n are inputted to a receiver circuit (RX) 3 via a duplexer (DUP) 2 after they have been received by an antenna 1. In the receiver circuit 3, the received radio signal is downconverted into an intermediate frequency signal. This downconversion is achieved by mixing the received radio signal with a receiving local oscillation signal outputted from a frequency synthesizer (SYN) 4. The frequency of the receiving local oscillation signal generated from the frequency synthesizer 4 is determined by a control signal SYC outputted from a control section 12.

The received intermediate frequency signal outputted from the receiver circuit 3 is inputted to a CDMA signal processing section 6. The CDMA signal processing section 6 first despreads the received intermediate frequency signal by means of a spread code. Then, the thus despreaded received intermediate frequency signal is demodulated by way of a demodulation scheme that corresponds to a QPSK modulation scheme, for example, thereby to be converted into demodulated data according to a data rate. The demodulated data is inputted to a compressor/expander 7 (hereafter, referred to as "compandor 7").

The compandor 7 first applies decompression processing, to the demodulated data outputted from the CDMA signal processing section 6 according to a receiving data rate notified from the control section 12. Next, with respect to the decompressed demodulated data, error correction/decoding processing using a Viterbi decoding scheme, for example, is performed, thereby reproducing received speech baseband data or received packet baseband data. Then, the received speech data is outputted to a PCM encode/decode processing section (PCM encoder/decoder) 8 (hereinafter, referred to as a PCM codec 8), and received packet data such as E-mail is outputted to the control section 12, respectively.

The PCM codec 8 decodes the received speech data outputted from the compandor 7, and outputs an analog speech signal. The analog speech signal is outputted by a speaker 10 after being amplified by a speech amplifier 9.

The control section 12 de-packets received packet data such as E-mail outputted from the compandor 7. Then, the control section stores the de-paketed data in a received data storage area contained in a memory 13. In the case where a user makes an operation for displaying received data at an input portion 14, the received data is read out from the memory 13, and then, is displayed at a display portion 15 according to this operation. In the case where a personal computer such as notebook type personal computer is connected to the mobile communication terminal, the control section 12 has a function for outputting the received packet data to the personal computer via an external interface (not shown).

On the other hand, during communication, a user speech signal inputted to a microphone 11 is amplified to a proper level by a speech amplifier 18. The amplified user speech signal is PCM encoded by the PCM codec 8. The PCM encoded speech signal is inputted to the compandor 7. In addition, packet data such as E-mail generated at the control section 12 is inputted from the control section 12 to the compandor 7.

The compandor 7 detects an energy quantity of the speech signal based on the PCM encoded speech signal from the PCM codec 8, and determines a data rate based on the detection result. Then, the compandor 7 compresses the transmission speech data (into a signal) in accordance with a format according to the determined data rate, further applies error correction/encoding processing to the compressed signal, and then, outputs it to the CDMA signal processing section 6. In contrast, during packet data transmission, packet data outputted from the control section 12 is subjected to the error correction/encoding processing to be outputted to the CDMA signal processing section 6.

The CDMA signal processing section 6 QPSK modulates the compressed transmission speech data signal based on a transmission intermediate frequency signal. Next, spectrum spread processing is applied to the modulated transmission speech data signal by using a spread code assigned to each transmission channel. Then, the CDMA signal processing section outputs the spread transmission data signal to a transmitter circuit (TX) 5.

The transmitter circuit 5 combines the spread transmission speech data with a local transmission oscillation signal generated from a frequency synthesizer 4, thereby generating the combined signal as a radio signal. Then, the transmitter circuit 5 amplifies the necessary portion of the radio signal based on the transmission data rate to be notified by the control section 12, and outputs the amplified radio signal as a radio transmission signal. The radio transmission signal outputted from the transmitter circuit 5 is supplied to an antenna 1 via a duplexer 2, and is transmitted from the antenna 1 to base station to be connected.

At an input portion 14, there are provided keys such as a dial key, a call key, a power supply key, a quit key, a volume control key, and mode specification key. In addition, an LCD display and an LED lamp are included in the display portion 15. The LCD display displays the caller phone number and caller name notified by the CLI message, phone book storage information, information representing a mobile communication terminal operation state, and sent/received mail or the like. In addition, the LED lamp is used for displaying a discharge state of a battery 16. Reference numeral 17 denotes a power supply circuit. The circuit 17 generates a predetermined operating power voltage Vcc power based on an output of the battery 16, and supplies the voltage power to each circuit portion.

In the meantime, a memory 13 has a phone book storage area 13a and a user setting area 13b. The phone book storage area 13a stores a phone book 400. The phone book 400 stores user identification information on a terminal which an outgoing call or an incoming call is expected. The user identification information comprises a user phone number and a user name. As a user name, it is possible to register a nickname as well as a full name. FIG. 3 shows an example of the user identification information stored in the phone book 400. As the user identification information, there can be stored attribute information such as the terminal user's address or business address and department/section as well as phone number and name.

The user setting area 13b stores information representing a display mode of the caller identification information inputted by the terminal user.

On the other hand, the control section 12 has a microprocessor that is a main control section. As control functions according to the present invention, the control section 12 has a display mode setting reception function 12a, a display mode determination function 12b, a phone book reference function 12c, and a display control function 12d.

In the case where the terminal user sets a display mode of the caller identification information at the input portion 14, the display mode setting reception function 12a stores information representing the display mode inputted by the operation in the user area 13b contained in the memory 13. The display modes include: a CLI message priority display mode (a first display mode) for displaying only the caller identification information notified by the CLI message; a phone book priority display mode (a second display mode) for displaying user only the identification information stored in the phone book 400; and a display mode (a third display mode) for displaying both the caller identification information in the CLI message and user identification information in the phone book 400.

In the case where the terminal receiver a CLI message, the display mode determination function determines whether the current set mode is a CLI message priority display mode, a phone book priority display mode, or a mode for displaying both the caller identification information in the CLI message and the user identification information contained in the phone book 400, based on the information stored in the user setting area 13b contained in the memory 13.

In the case where it is determined by the display mode determination function 12b that the phone book priority display mode is set, the phone book reference function 12c sequentially compares the caller phone number contained in the received CLI message with the user phone number of each terminal user stored in the phone book 400. Then, it is determined whether the stored user phone number coincides with the caller phone number or not.

In the case where it is determined by the above display mode determination function 12*b* that the CLI message priority display mode is set, the display control function 12*d* displays the caller name contained in the received CLI message on the LCD display 15. In addition, when it is determined by the display mode determination function 12*b* that the phone book priority display mode is set and where the stored phone number coincides with the caller phone number notified by the CLI message, the terminal user name stored in the phone book 400 is displayed on the LCD display 15. Further, in the case where it is determined by the above display mode determination function 12*b* that the phone book priority display mode is set, and anyone of the stored phone number does not coincides with the caller phone number notified by the CLI message, the LCD display 15 displays the caller name and the user phone number contained in the received CLI message.

The operations involved in a call, from terminal 102 to terminal 101 will be explained, based on the above configuration.

Figure 5:
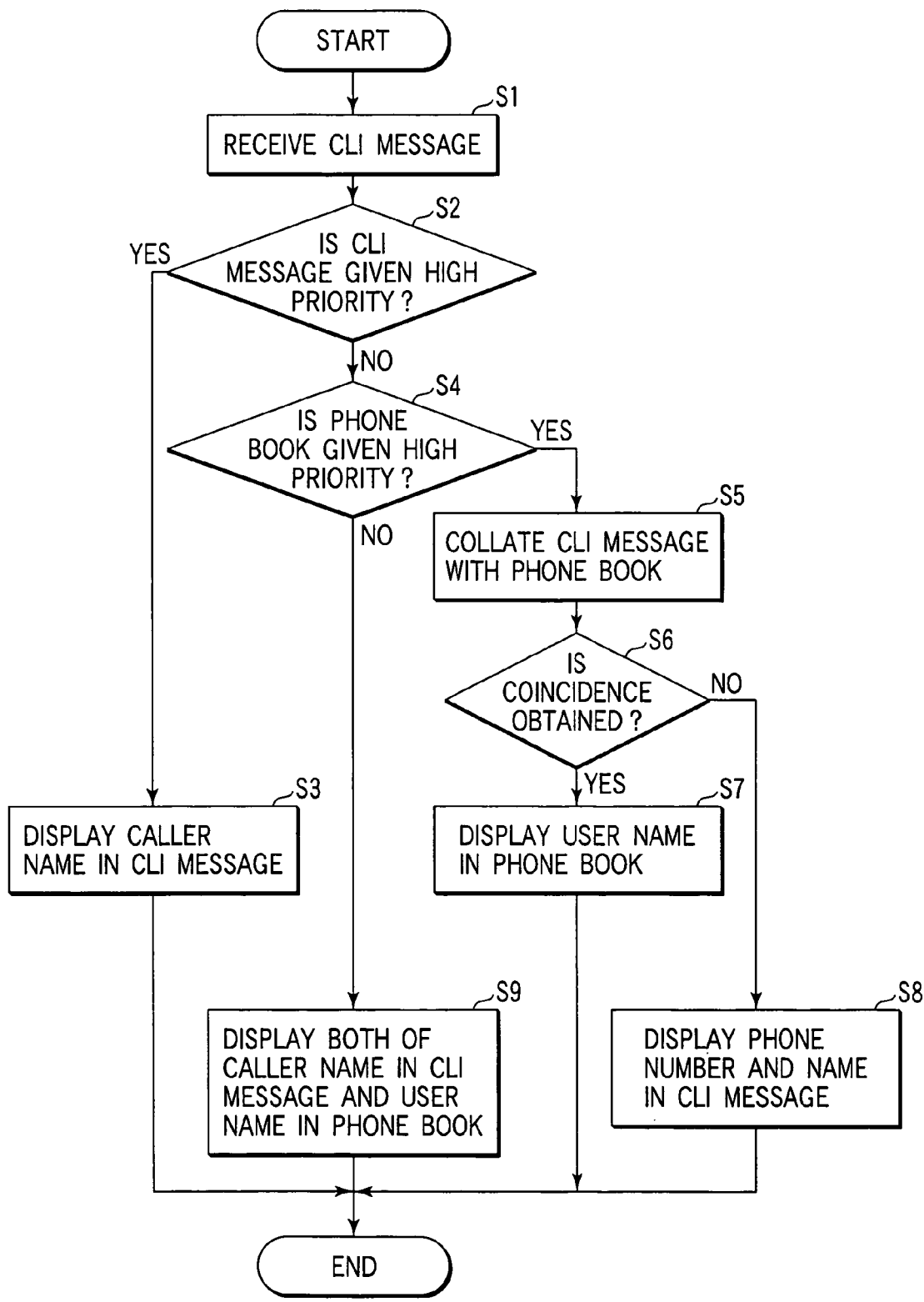
FIG. 5 is a flow chart showing control contents of, and display control procedures for, caller identification information caused by the mobile communication terminal shown in FIG. 2.

FIG. 5 is a flow chart showing the control procedures of the control section 12 for displaying the caller identification information when a call is made to terminal 101.

In a standby state, a user of the mobile communication terminal 101 sets one's desired caller information display mode. The setting is achieved by specifying the user desired display mode from among three stored display modes, i.e., the CLI message priority display mode, the phone book priority display mode, and the mode for displaying both of the caller identification information in the CLI message and the user identification information in the phone book 400, at the input portion 14. The information on the specified display mode is stored in the user setting area 13*b*.

In this state, assume that the incoming call signal from the mobile communication network 300 is received by the terminal 101. Then, the control section 12 receives the CLI message included the incoming signal at the step S1, and temporarily stores the received CLI message in a memory incorporated in the control section 12. Next, at the steps S2 and S4, it is determined whether the current set display mode is the CLI message priority display mode, the phone book priority display mode, or the mode for displaying both of the caller identification information in the CLI message and the user identification information in the phone book 400 based on the information stored in the user setting area 13*b* contained in the memory 13.

As a result of the determination, assume that the CLI message priority display mode is set. In this case, the control section 12 extracts the caller name from the received CLI message, and displays the extracted caller name on the LCD display of the display portion 15. For example, if a caller name SUZUKI KAZUHIRO is inserted into the CLI message, the control section displays the caller name as shown in FIG. 6.

Next, as a result of the above determination, assume that the phone book priority display mode is set. In this case, the control section 12 goes to the step S5 at which the caller phone number inserted into the received CLI message is sequentially compared with the stored phone number in the phone book 400. If the caller phone number in the received CLI message coincides with one of the stored phone number in the phone book 400, processing proceeds to step S7. At the step S7, the user name corresponding to the stored phone number coinciding with the received caller phone number is read out from the phonebook 400. Then, the LCD display of the display portion 15 displays the read user name.

For example, assume that the caller phone number 090-0000-9876 shown in FIG. 4 is inserted into the received CLI message, and the received caller phone number identical to one of the stored phone number as shown in FIG. 3. In this case, the control section 12 reads out from the phone book 400 the user name "KAZ", associated with the stored phone number 090-0000-9876. Then, the control section displays this user name "KAZ", as in FIG. 7. Therefore, the user of terminal 101 can easily recognize who is calling if the nickname "KAZ" stored in the phone book 400 is displayed.

In contrast, as a result of collation at the step S5, assume that the received caller phone number is not stored in the phone book 400. Then, the control section 12 proceeds from step 6 to step 8, at which the received caller phone number and the received caller name are extracted from the received CLI message. Then, the control section displays the received caller phone number and the received caller name on the LCD.

For example, assuming that the received caller phone number 090-□□□□-5432 and the received caller name "TOKYO MAMI" are inserted into the CLI message the received 090-□□□□-5432 is stored in the phonebook 400. Then the received caller phone number and the received caller name are displayed on the LCD, as in FIG. 8. Therefore, even in the case where the receiver caller phone number notified by the CLI message is not registered in the phone book 400, the user of the called terminal 101 can recognize the caller by the received phone number and the received caller name.

In the case where a caller name is not inserted into the CLI message, only the received caller phone number is displayed.

Lastly, as a result of the determination at the steps S2 and S4, neither the CLI message priority display mode nor phone book priority display mode is set. In this case, the control section 12 determines that a displays mode for displaying both of the identification information in the CLI message and the user identification information in the phone book 400 is set. Then, processing goes to the step S9 at which the received caller name in the received CLI message and the stored user name in the phone book 400 are displayed on the LCD display.

For example, assume that the received caller phone number 090-0000-9876 and the caller name SUZUKI KAZUHIRO shown in FIG. 4 are inserted into the received CLI message, and the received caller phone number is identical to one of the stored phone numbers in the phone book 400 as shown in FIG. 3. In this case, the control section 12 read out from the phone book 400 a stored user name "KAZI" associated with the phone number 090-0000-9876 identical to the received caller phone number. Then, the control section displays the stored user name "KAZ" together with the received caller name "SUZUKI KAZUHIRO" on the LCD, as in FIG. 9.

Therefore, it becomes possible for the user of terminal 101 to recognize the caller simply and precisely from the caller full name notified by the CLI message and the nickname read out from the phone book 400.

As described above, in the mobile communication terminals 101 and 102 according to the present embodiment, caller identification information display modes include a CLI message priority display mode, a phone book priority display mode, and a mode for displaying both of the caller identification information in the CLI message and the user identification information in the phone book 400, each of which is pre-set in the terminals 101, 102 while the user waits for one of these display modes. In the case where the terminal 101 receives the incoming call signal in this state, it is determined whether one of the three display modes is set. Then, according to this determination result, the received caller name inserted into the receives CLI message and/or the stored user name read out from the phone book are displayed on the LCD display. Therefore, the terminal user can selectively set the desired display mode. As a result, the caller name the received caller name and/or the stored user name can be displayed according to the desired display mode suitable to the needs of each terminal user.

In addition, in the case where the phone book priority display mode is set, the received caller phone number inserted into the received CLI message is compared with each phone number stored in the phone book 400. Then, in the case where the received caller phone number coincident with one of the stored phone numbers in the phone book 400, the stored name corresponding to the stored phone number coinciding with the received caller phone number is displayed. Otherwise, the receives caller phone number and the received user name inserted into the received CLI message are displayed. Therefore, even in the case where the received caller phone number notified by the CLI message is not registered in the phone book 400, the user of the terminal called can recognize the caller by its phone number and name.

The present invention is not limited to the above described embodiments. For example, in the foregoing embodiments, a description has been given by way of showing an example of a mobile communication network comprising its CLI message notification function and mobile communication terminals connected to this network. However, the present invention is applicable to a wired communication network comprising its CLI message notification function and a fixed communication terminal connected to the wired network as well, without being limited thereto.

Otherwise, with respect to the type or configuration of communication terminals, display mode setting procedures, or display control procedures and control contents in each of the first, second, and third display modes as well, various modification can be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication terminal adapted to be connected to a network which provides a service function for notifying of a message that contains a caller phone number and a caller name, the communication terminal comprising:
   a phone book for storing user identification information containing a user phone number and a user name to be associated with the user phone number for each communication party user;
   message receiving means for receiving the caller phone number and the caller name in the message included in an incoming call signal from the network;
   display mode selling means for setting either a first display mode for displaying only the received message received by said message receiving means or a second display mode for displaying only the user identification information stored in the phone book;
   determining means for determining whether the first display mode or second display mode is set by said display mode setting means;
   comparing means for comparing the received caller phone number with each stored user phone number stored in the phone book; and
   display means for displaying the received caller name and the stored user name corresponding to a stored user phone number that coincides with the received caller phone number according to the determination result of the determining means, wherein said display means displays only the message received by said message receiving means when the first display mode is set or when the received caller phone number does not coincide with one of the user phone numbers stored in the phone book, and displays only the stored user identification information including one of the stored phone numbers when the received caller phone number coincides with one of the user phone numbers stored in the phone book.

2. A radio communication terminal comprising:
   a phone book for storing user identification information containing a user phone number and a user name to be associated with the user phone number for each communication party user;
   receiving means for receiving an incoming call signal including a caller phone number and a caller name;
   display mode setting means for setting either a first display mode for displaying only the message received by said message receiving means or a second display mode for displaying only the user identification information stored in the phone book;
   determining means for determining whether the first display mode or second display mode is set by said display mode setting means;
   comparing means for comparing the received caller phone number with each stored user phone number stored in the phone book; and
   display means for displaying the received caller name and the stored user name corresponding to a stored user phone number that coincides with the received caller phone number according to the determination result of the determining means, wherein said display means displays only the message received by said receiving means when the first display mode is set or when the received caller phone number does not coincide with one of the user phone numbers stored in the phone book, and displays only the stored user identification information including one of the stored phone numbers when the received caller phone number coincides with one of the user phone numbers stored in the phone book.

3. A radio communication terminal comprising:
   a memory for storing a phone number and a user name associated with the phone number;
   means for obtaining a caller phone number and a caller name from an incoming call;
   means for setting either a first display mode for displaying the obtained caller name or a second display mode for displaying the stored user name preferentially;
   means for comparing the obtained caller phone number with the stored user phone number; and
   means for displaying the obtained caller name when the first display mode is set or when the second display mode is set and the obtained caller phone number does not coincide with the stored phone number, and for displaying the stored user name when the second display mode is set and the obtained caller phone number coincides with the stored phone number.

4. A radio communication terminal comprising:
a memory for storing a phone number and a user name associated with the phone number;
means for obtaining a caller phone number and a caller name from an incoming call;
means for setting either a first display mode for displaying the obtained caller name or a second display mode for displaying the stored user name preferentially;
means for comparing the obtained caller phone number with the stored user phone number; and
means for displaying the obtained caller name when the first display mode is set;
means for displaying the obtained caller name when the obtained caller phone number does not coincide with the stored phone number and when the second mode is set, and for displaying the stored user name when the obtained caller phone number coincides with the stored phone number when the second mode is set.

* * * * *

UNITED STATES PATENT AND TRADEMARK OFFICE
CERTIFICATE OF CORRECTION

PATENT NO. : 7,127,237 B2 Page 1 of 1
APPLICATION NO. : 09/893905
DATED : October 24, 2006
INVENTOR(S) : Naruse et al.

It is certified that error appears in the above-identified patent and that said Letters Patent is hereby corrected as shown below:

Claim 1, column 9, line 65, change "selling" to --setting--.

Signed and Sealed this

Ninth Day of January, 2007

JON W. DUDAS
*Director of the United States Patent and Trademark Office*